United States Patent

[11] 3,627,713

| [72] | Inventors | Iwao Maruta<br>Funabashi-shi, Chiba;<br>Akihiko Iida, Chiba-shi, both of Japan |
|---|---|---|
| [21] | Appl. No. | 764,630 |
| [22] | Filed | Oct. 2, 1968 |
| [45] | Patented | Dec. 14, 1971 |
| [73] | Assignee | Kao Soap Co., Ltd.<br>Tokyo, Japan |
| [32] | Priority | Oct. 4, 1967 |
| [33] | | Japan |
| [31] | | 42/63928 |
|   |   | The portion of the term of the patent subsequent to June 18, 1985, has been disclaimed. |

[54] METHOD OF PREVENTING AGGLOMERATION OF POWDERED UREA-FORMALDEHYDE RESINS
8 Claims, No Drawings

[52] U.S. Cl..................................................... 260/15,
117/100 C, 117/138.8 G, 252/384, 260/29.4, 260/851
[51] Int. Cl...................................................... B32b 27/06,
C08b 21/32, C08g 37/32, C09k 3/18

[50] Field of Search........................................... 260/15, 851, 29.4, 17.3, 17.4; 252/384, 381; 117/100 O, 138.8 A, 138.8 G

[56] References Cited
UNITED STATES PATENTS

| 2,300,976 | 11/1942 | Scheuermann............... | 260/851 |
| 2,372,178 | 3/1945 | Corwin et al. ................ | 252/384 |
| 3,388,990 | 6/1968 | Maruta et al. ................ | 252/384 |

OTHER REFERENCES

Chem. Abstracts, Vol. 40, 5960, Andrianov et al. (1945) "-Composition-Arcs"- (USSR 64,909)

Chem. Abst., Vol. 68, 97007X (1967) Maruta et al. "Inhibition-Complexes"

Primary Examiner—William H. Short
Assistant Examiner—Edward Woodberry
Attorney—Woodhams, Blanchard and Flynn ABSTRACT: A method of preventing agglomeration of powdered urea-formaldehyde resins which comprises incorporating therein an antiagglomerating agent comprising a nondissociative water-soluble macromolecular compound and a surface active agent.

METHOD OF PREVENTING AGGLOMERATION OF POWDERED UREA-FORMALDEHYDE RESINS

BACKGROUND OF THE INVENTION

1. Field of the Invention

This invention relates to a method of preventing agglomeration of powdered urea-formaldehyde resins.

DESCRIPTION OF THE PRIOR ART

The term "powdered urea-formaldehyde resins" used herein refers to (1) water-soluble or insoluble powdered urea-formaldehyde resins obtained through methylol urea and dimethylol urea by heating urea and formaldehyde under acid conditions and (2) a molding urea resin compound which is obtained by first preparing a resin solution containing monomethylol urea, dimethylol urea and other precondensates by heating urea and formalin under neutral or weakly alkaline conditions, mixing said resin solution with fillers such as pulp and a pigment or dye, followed by heating, drying and then crushing the mixture.

These powdered urea-formaldehyde resins have been widely used to make various molded articles and they are known as excellent molding materials. However, they are susceptible to becoming agglomerated during handling and storage so that the efficiency in the molding operation has been reduced. A solution to this problem has been desired for a long time.

As antiagglomerating agents, it is well known to use fine powdery inorganic substances such as kaolin, bentonite and calcium carbonate. However, depending on the end uses of the molded articles, it is often undesirable to add these antiagglomerating agents to powdered urea-formaldehyde resins. Further, they will give usually negative effects on the appearance, strength and electric properties of the molded products and, therefore, it is sometimes impossible to use them.

Therefore, it is an object of the present invention to provide an excellent antiagglomerating agent for powdered urea-formaldehyde resins which will not adversely influence the above-described properties of molded urea resin products.

SUMMARY OF THE INVENTION

We have studied methods for preventing the agglomeration of powdered urea-formaldehyde resins, as above mentioned, and have discovered that, if a small amount of a mixed aqueous solution of a concentration of about 0.1–20 percent, preferably 1–10 percent, by weight of a nondissociative water-soluble macromolecular compound and a surface active agent, is added to a powdered urea-formaldehyde resin, an excellent antiagglomerating effect will be obtained and the properties of the molded articles will not be adversely influenced by the addition of said mixed aqueous solution.

As the above-mentioned nondissociative water-soluble macromolecular compounds to be used in the present invention, there are exemplified polyvinyl alcohols (which shall be abbreviated as PVA hereinafter), polyvinyl pyrrolidones (which shall be abbreviated as PVP hereinafter), polyvinyl methylethers, polyvinyl oxazolidinones such as poly N-vinyl-5-methyl-2-oxazolidinones, water-soluble partially saponified polyvinyl acetates (polyvinyl acetates shall be abbreviated as PVAc hereinafter), partially acetylated PVA, partial acetalized PVA, polyvinyl acrylamides and methylcelluloses.

The kinds of the surface active agents which can be used together with the above-mentioned nondissociative water-soluble macromolecular compounds are not particularly limited. However, typical examples of suitable surface active agents include anionic surface active agents, sulfuric acid ester salts of higher alcohols such as sodium dodecylsulfate (which shall be abbreviated as SDS hereinafter), alkylbenzene sulfonates such as sodium dodecylbenzene sulfonate (which shall be abbreviated as DBS hereinafter), higher carboxylates such as sodium oleate (which shall be abbreviated as OS hereinafter) and rosin soaps (which shall be abbreviated as RS hereinafter), sulfuric acid esters of nonionic surface active agents such as sodium dodecylpolyoxyethylene sulfate (which shall be abbreviated as SDPS hereinafter), dialkylsulfonates such as sodium dioctylsulfosuccinate, alkylsulfonates such as sodium dodecylsulfonate, alkylnaphthalene sulfonates such as sodium propylnaphthalenesulfonate (PNS) and their mixtures.

As nonionic surface active agents, there can be used alkoxy and alkyl phenoxypolyethenoxyethanols, polyhydric alcohol fatty acid esters such as sorbitane monoleate and alkylalkanol amides.

As cationic surface active agents, there can be used alkyltrimethylammonium chlorides, alkylpyridinium chlorides and alkylamine hydrochlorides.

There can be used also amphoteric surface active agents represented by alkyl $\beta$-alanines and alkyl betaines.

As in the above, any of anionic, nonionic, cationic and amphoteric surface active agents can be used. However, the greatest antiagglomerating effect will be obtained when an anionic surface active agent is used.

For methods of applying the antiagglomerating agent of the present invention to the urea-formaldehyde resin powders, any method which can incorporate said resin uniformly in said powders can be used in the present invention.

However, in carrying out the method of the present invention, it is generally preferable to spray a powdered urea-formaldehyde resin with a mixed aqueous solution of a nondissociative macromolecular compound and a surface active agent. But, a predetermined amount of the surface active agent and the nondissociative high-molecular-weight compound may be added to a very early reaction stage of the urea and formaldehyde, that is, to a syrupy resin solution in which viscous monomethylol urea and dimethylol urea are the main ingredients and then the mixture can be made into a powdered resin compound by a standard process.

The ratio by weight of the surface active agent to the nondissociative macromolecular compound is preferably in the range of 1:10 to 10:1. Particularly, 8 to 6 parts by weight of the surface active agent to 2 to 4 parts by weight of the nondissociative macromolecular compound are preferable.

In carrying out the present invention, the sum of the nondissociative macromolecular compound and the surface active agent (calculated as the solids) should be between about 0.005 percent to 2.0 percent by weight, preferably, 0.05–0.5 percent by weight, based on the weight of the urea-formaldehyde resin powders to be treated.

DESCRIPTION OF THE PREFERRED EMBODIMENTS

The present invention shall now be explained with reference to the following illustrative examples.

EXAMPLE 1

150 g. samples of a powdered urea-formaldehyde resin, prepared by making 2.2 mols of formaldehyde react on 1 mol of urea in the presence of a hydrochloric acid catalyst, were sprayed with 4 g. of PVA-SDS solutions of the respective concentrations as described below, were dried at 20° C. under a reduced pressure (2 mm.Hg) and were crushed to be of less than 80-mesh size. One hundred g. of this resin powder were put into a beaker of capacity of 300 ml. and were made to absorb moisture at 40° C. under 80 percent R.H. for 1 hour and then the penetration for 5 seconds was measured with a penetrometer. Separately, the weight of the residue after the powder was passed through a 10-mesh sieve was also measured. The results shown in the following table 1 were obtained.

TABLE 1

| Antiagglomerating agents | Concentration [a] | Amount of addition (2), percent (3) | Penetration (mm.) | Sieve residue (4), (g.) |
|---|---|---|---|---|
| PVA-SDS[1] | — | 0 | 0.98 | 92 |
|  | 3.0 | 0.08 | 2.0 | 40 |
|  | 6.0 | 0.16 | 4.0 | 27 |
|  | 7.5 | 0.20 | 3.5 | 35 |
| PVA | 6.0 | 0.16 | 1.2 | 85 |
| SDS | 6.0 | 0.16 | 1.1 | 88 |

[1] PVA (of a polymerization degree of 1400) (g.)/surface active agent (g.) = ⅓.

[a] Anti-agglomerating agent concentration (percent by weight).

(1) PVA (of a polymerization degree of 1,400) (g)/surface active agent (g)=¼ (2) Amount of antiagglomerating agent added in g. to 100 g. of the urea-formaldehyde resin. (3) The higher the penetration, the higher the antiagglomerating effect. (4) The less the residue on the sieve, the higher the antiagglomerating effect.

It will be understood from table 1 that, according to the method of the present invention, an excellent antiagglomerating effect can be obtained.

The powdered urea-formaldehyde resin subjected to the above-mentioned antiagglomerating treatment was heated and molded by a standard conventional process. Such various properties as the strength, hardness, electric properties, transparency and chemical resistance of the molded resin were exactly the same as those of a similar resin which was not subjected to the antiagglomerating treatment.

EXAMPLE 2

Four g. of PVA-SDS aqueous solutions (3.75 percent by weight solids in the solution and the solid content being 0.1 percent based on the weight of the urea-formaldehyde resin) of the respective concentrations listed below were added by spraying to 150 g. samples of the same powdered urea-formaldehyde resin as in example 1 and the antiagglomerating effect was determined according to the process in example 1. The results are listed in table 2.

TABLE 2

| PVA/SDS mixing ratio, (percent) | | Penetration (mm.) | Sieve residue (g.) |
|---|---|---|---|
| PVA | SDS | | |
| 100 | 0 | 1.2 | 85 |
| 80 | 20 | 3.0 | 40 |
| 60 | 40 | 4.0 | 27 |
| 40 | 60 | 4.3 | 25 |
| 20 | 80 | 4.1 | 42 |
| 0 | 100 | 1.1 | 88 |

NOTE.—Polymerization degree of PVA: 1,400.

It will be understood from table 2 that the PVA-SDS solutions have excellent antiagglomerating effects.

EXAMPLE 3

0.1 percent (by weight calculated as the solids) of each antiagglomerant agent listed below (in the form of an aqueous solution containing 5 percent by weight solids) was added by spraying to a 150 g. sample of commercially available molding urea resin compound ("National-lite" manufactured by Matsushita Electric Works, Ltd., Japan and the mixture was dried at 20° C. under a reduced pressure and was crushed to be of less than 80-mesh size. 100 g. of this resin powder were put into a beaker of a capacity of 300 ml. and were made to absorb moisture at 40° C. under 80 percent R.H. for 1 hour and then the penetration for 5 seconds was measured with a penetrometer. The weight of the residue after the powder was passed through a 10-mesh sieve was also measured. The results listed in tables 3 and 4 were obtained.

TABLE 3

| Antiagglomerating agents [1] | Degree of polymerization of macromolecular compound | Penetration (mm.) | Sieve residue (g.) |
|---|---|---|---|
| PVP-SDS | 400 | 2.8 | 56 |
| MC [2]-SDS | | 2.8 | 39 |
| PVAL [3]-SDS | 1,400 | 3.4 | 50 |
| Partially saponified PVAC [4]-SDS | 1,100 | 4.0 | 56 |
| MC | | 7.5 | 90 |
| PVP | 400 | 1.0 | 91 |
| PAA (Na)-SDS | | 1.1 | 89 |
| PAA [5] (Na) | 80 | 1.0 | 91 |

(1) Macromolecular compound (g)/surface active agent (g)=⅓ (2) Methylcellulose (of a trade name of Methocel) produced by Dow Chemical Company, U.S.A. was used. (3) Degree of Acetalization : 10 mol percent (4) Degree of Saponification : 90 mol percent (5) Sodium polyacrylate

TABLE 4

| Antiagglomerating agents | Penetration (mm.) | Sieve residue (g.) |
|---|---|---|
| PVA[1]-RS | 4.0 | 30 |
| PVA-PNS | 3.5 | 40 |
| PVA-OS | 3.2 | 42 |
| PVA[1]-A[2] | 2.8 | 67 |
| PVA-B[3] | 2.6 | 65 |
| PVA-C[4] | 2.7 | 60 |

(1) Degree of Polymerization of PVA=1,400 (2) A: Laurylmethylammonium chloride (3) B: Polyoxyethylene (47) lauryl ether (4) C: Lauryl betaine As evident from tables 3 and 4, according to the method of the present invention, an excellent antiagglomerating effect can be obtained.

We claim:

1. A method of preventing agglomeration of urea-formaldehyde resin powder, which comprises applying to said resin powder an aqueous solution of a mixture of (1) a nondissociative water-soluble macromolecular compound and (2) an organic surface active agent, in which the weight ratio of (1) to (2) is in the range of from 1:10 to 10:1, said surface active agent being selected from the group consisting of anionic, nonionic, cationic and amphoteric organic surface active agents, said nondissociative water-soluble macromolecular compound being selected from the group consisting of water-soluble polyvinyl alcohols, polyvinyl pyrrolidones, polyvinyl methylethers, polyvinyl oxazolidinones, water-soluble partially saponified polyvinyl acetates, partially acetylated polyvinyl alcohols, partially acetalized polyvinyl alcohols, polyvinyl acrylamides and methyl celluloses, the sum of said surface active agent and said nondissociative water-soluble macromolecular compound, calculated as the solids, added to said resin powder being from about 0.005 percent to 2.0 percent by weight of the resin powder, and drying said resin powder to remove water, whereby to produce a dried resin powder having improved nonagglomerating characteristics.

2. The method according to claim 1 in which the aqueous mixed solution contains from 0.1 percent to 20 percent by weight of the macromolecular compound and the organic surface active agent.

3. The method according to claim 1, in which said aqueous mixed solution is applied to said resin by spraying.

4. The method according to claim 1, in which said powdered urea-formaldehyde resin is a molding urea resin compound.

5. A method according to claim 1, in which the ratio by weight of the surface active agent to the nondissociative water-soluble macromolecular compound is in the range of 8 to 6 parts by weight of the surface active agent to 2 to 4 parts by weight of the nondissociative water-soluble macromolecular compound.

6. A method according to claim 1, in which the sum of said surface active agent and said nondissociative water-soluble macromolecular compound, calculated as the solids, added to said resin powder is from 0.05 percent to 0.5 percent by weight of the resin powder.

7. A moldable plastic material, comprising discrete particles of urea-formaldehyde resin coated with from about 0.005 percent to 2.0 percent by weight, based on the weight of the resin, of a dry antiagglomerating agent consisting of a mixture of (1) a nondissociative water-soluble macromolecular compound and (2) an organic surface active agent, said surface active agent being selected from the group consisting of anionic, nonionic, cationic and amphoteric organic surface active agents, said nondissociative water-soluble macromolecular compound being selected from the group consisting of water-soluble polyvinyl alcohols, polyvinyl pyrrolidones, polyvinyl methylethers, polyvinyl oxazolidinones, water-soluble partially saponified polyvinyl acetates, partially aceylated polyvinyl alcohols, partially acetalized polyvinyl alcohols, polyvinyl acrylamides and methyl celluloses, the ratio of said nondissociative water-soluble macromolecular compound to said surface active agent, in said antiagglomerating agent, being from 1:10 to 10:1 parts by weight.

8. A moldable plastic material according to claim 7, in which the urea-formaldehyde resin particles are coated with from about 0.05 percent to 0.5 percent by weight of the antiagglomerating agent.

* * * * *